F. Meyer.
Grinding Scale Pivots.
No. 2966
Reissued Jun. 2, 1868.
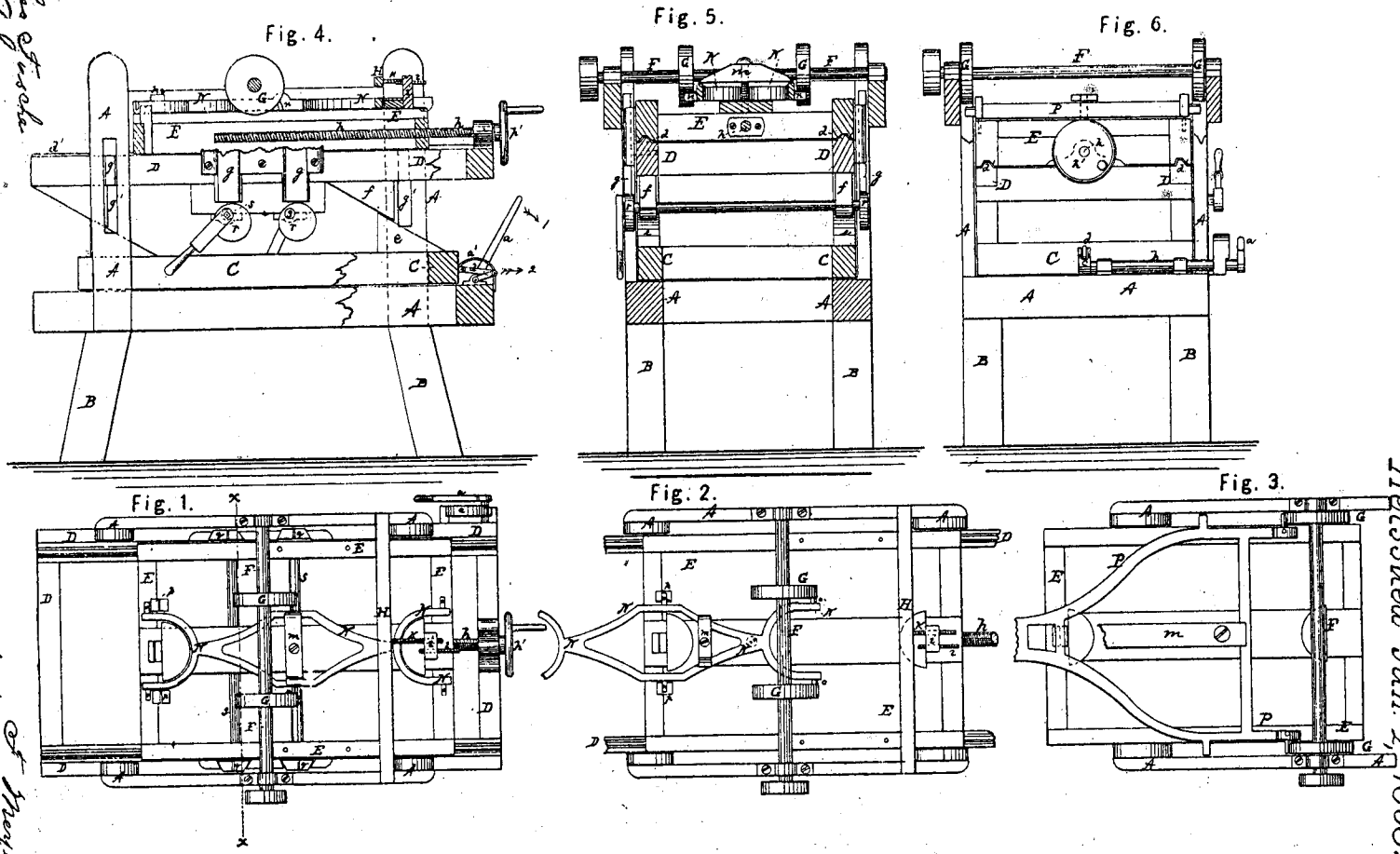
Witnesses.
Thos Fusche
J. A. Serrine
Inventor.
F. Meyers
Per Munn & Co
Attorneys

United States Patent Office.

FREDERICK MEYER, OF NEWARK, NEW JERSEY.

*Letters Patent No.* 64,686, *dated May* 14, 1867; *reissue No.* 2,966, *dated June* 2, 1868.

IMPROVEMENT IN MACHINE FOR GRINDING SCALE-PIVOTS.

The Schedule referred to in these Letters Patent and making part of the same.

TO ALL WHOM IT MAY CONCERN:

Be it known that I, FREDERICK MEYER, of Newark, Essex county, New Jersey, have invented a new and improved Machine for Grinding and Gauging Scale-Pivots; and I do hereby declare that the following is a full, clear, and exact description thereof, which will enable others skilled in the art to make and use the same, reference being had to the accompanying drawings, forming part of this specification.

The object of this invention is to grind or polish the pivots on scale-beams and levers, in such a manner that thereby the same are correctly gauged, so that the distances betweeen the different pivots are exactly and automatically determined.

The invention consists in arranging a set of revolving emery-wheels on a stationary frame, and in so constructing and making a horizontal sliding carriage, and providing the same with stop-pins or screws, that when the scale-beam or lever is laid upon the said sliding carriage, it may be fed to the emery-wheels, so that the same will grind and polish the pivots.

The said pins or set-screws, striking against some stationary beams or other obstruction, do thereby determine how far the carriage may move, and how much of the pivots is to be ground off. Thus, by reversing the position of the lever on the carriage, the distance of the end pivots from the centre pivots, on scale-beams for common lever-scales, is very accurately gauged, so that both ends will be exactly equally far from the centre.

In the annexed drawings, my invention is completely illustrated—

Figure 1 being a plan or top view of my improved machine, in position for grinding the centre pivots of a lever.

Figure 2 is a similar view, the parts being in position to grind the pivots, which are on one end of the lever.

Figure 3 is a similar view, the parts being in position for grinding the pivots on a lever for platform-scales.

Figure 4 is a side elevation of my machine, partly in section.

Figure 5 is a vertical transverse section of the same, taken on the line *x x*, fig. 1.

Figure 6 is an end view of the same, partly in section.

Similar letters of reference indicate corresponding parts.

A is a frame, which is made of wood, or of any other suitable material, strong enough to support all the working parts of this machine.

The frame is supported by four (more or less) uprights, B, as shown in the drawings. A rectangular frame, C, is placed upon the frame A, and can be moved forward or backward by a lever, *a*, which is secured to a horizontal shaft, *b*, as seen, to which a cam, *c*, is secured, connecting with a lever, *d*, the latter being pivoted to the frame C.

By moving the lever *a* in the direction of the arrow 1, (fig. 4,) the frame C will be moved in the direction indicated by the arrow 2, and *vice versa*.

This frame C may as well be moved by means of screws or other analogous devices. Upon each side of this frame C is secured a triangular block, *e*, the inclined edge of which comes in contact with an incline, *f*, on a frame, D, which is arranged above the frame C, as shown, so that when the frame C is moved, as indicated by the arrow 2, the frame D will be raised, and when C is moved in the opposite direction, D will be lowered.

The frame D is guided by means of pins or blocks, *g*, which slide in slots, *g'*, arranged in the frame A, as shown in fig. 4.

Rails, *d'*, are arranged on the upper surface of the side-bars of the frame D.

Upon these rails slides and is arranged the carriage E, as shown, which is moved forward or backward by a screw, *h*, which is secured to the frame D, and is operated by a crank-wheel, *h'*.

Other devices may be used for the purpose of moving and adjusting the carriage E.

A shaft, F, is arranged on top of the frame A, as shown, and upon it are mounted emery-wheels or grindstones, G, by which the pivots are ground.

An upright arm, *i*, which is arranged on one end of the carriage E, is provided with two (more or less) set-screws or pins, *k* and *l*, which strike against a bar, H, as the carriage is moved, said bar H being firmly secured to the frame A.

To grind the scale-pivots, the lever or arm is placed upon the carriage E, which is made to suit the size and shape of the scale-beams or lever. The same is then fastened down by means of cross-bars and screw *m*. The carriage is then raised by means of the lever *a*, which lever is held in a notch in the bent plate *a'*, whereby the carriage is prevented from dropping again. The centre pivots, *n*, of the lever, are first ground.

The carriage is, when the lever N is placed thereon, as shown in figs. 1 and 4, moved by the screw *h*, in the direction of the arrow 3, fig. 4, until the pin *k* strikes the bar H. As soon as this is the case, that side of the pivots has been ground sufficiently. The carriage is then lowered, and is, by means of the screw *h*, moved in the direction of the arrow 3, until the pin *l* will be on the inside of bar H, or until the pivots *n* will offer their unground surface to the wheels G.

Then the carriage is raised and moved in the opposite direction until *l* strikes H. In fig. 5 this second position is shown.

To grind the end pivots *o o*, the beam is secured to the carriage, as indicated in fig. 2.

The sharp edges of the centre pivots fit into notches, *p p*, on the carriage, so that when one end is finished the other end might be brought into the same position.

The stops *k* and *l* will then stop the carriage equally for each set of end pivots, and so the end pivots must be exactly equally far from the centre pivots.

In figs. 3 and 6 is shown a lever, P, for platform-scales. It is secured in the same way as the other lever. If it should be too broad, upright sliding bars *q q*, which are operated by cams *r r*, on shafts S S, may be raised, to support the projecting parts of the lever.

The wheels G must be shifted on the shaft F, so as to come in line with the pivots, as shown in fig. 3.

Having thus described my invention, what I claim as new, and desire to secure by Letters Patent, is—

1. The combination of the two adjustable revolving grinding-wheels G, with the reciprocating carriage E, provided with head-blocks *i*, notched rests *p*, and clamping-device M, for holding the scale-beam, arranged substantially as described, whereby the knife-edges or pivots of scale-beams are ground to great accuracy of adjustment, as set forth.

2. The construction and arrangement of the longitudinally-sliding carriage C, reciprocating carriage D, and carriage E, as herein set forth for the purpose specified; and 3. Adjusting the scale-pivots to be ground upon both sides, by means of the set-screws or pins *k l*, secured to the arm *i* of the sliding carriage E, and bar H upon the frame A, substantially as herein set forth.

The above specification of my invention signed by me, this 22d day of May, 1867.

FREDERICK MEYER.

Witnesses:

WM. F. MCNAMARA,
ALEX. F. ROBERTS.